United States Patent [19]

Wiedemann et al.

[11] Patent Number: 5,685,999

[45] Date of Patent: Nov. 11, 1997

[54] COMPACT LASER MACHINING HEAD WITH INTEGRATED ON-LINE PATH CONTROL FOR LASER MACHINING OF MATERIAL

[75] Inventors: Guenter Wiedemann, Dresden; Dirk Grueneberg, Menz; Lothar Morgenthal, Dresden; Walter Schwabe, Annaberger Strasse 240, D-09125 Chemnitz; Klaus Barthel, Munich; Ruediger Arnold Gnann, Ravensburg, all of Germany

[73] Assignees: Dr. Klaus Barthel Sensorsysteme GmbH, Taufkirchen; Maschinenfabrik Arnold GmbH & Co., KG, Ravensburg; Walter Schwabe, Einsiedel, all of Germany

[21] Appl. No.: 531,839

[22] Filed: Sep. 21, 1995

[30] Foreign Application Priority Data

Sep. 21, 1994 [DE] Germany ............................ 44 33 675.6

[51] Int. Cl.⁶ .................................................. B23K 26/00
[52] U.S. Cl. .............................. 219/121.83; 219/121.78; 219/121.84
[58] Field of Search .................... 219/121.78, 121.79, 219/121.81, 121.83, 121.84

[56] References Cited

U.S. PATENT DOCUMENTS

| 5,001,324 | 3/1991 | Aiello et al. | 219/121.78 |
| 5,359,176 | 10/1994 | Balliet, Jr. et al. | 219/121.84 |
| 5,374,804 | 12/1994 | Uchino et al. | 219/121.78 |

FOREIGN PATENT DOCUMENTS

| 490146 | 6/1992 | European Pat. Off. | 219/121.83 |
| 4-94883 | 3/1992 | Japan | 219/121.83 |
| 4-138886 | 5/1992 | Japan | 219/121.78 |

OTHER PUBLICATIONS

*Laser*, Jun. 1993 entitled "Scout sorgt für Präzision", pp. 42–43.

*Sensoranwendungen und Qualitätssicherung in der Laserbearbeitung*, Oct. 1993 in Dornach entitled "Sensorik beim Laserstrahl–schneiden und–schweissen" by Stephan Biermann.

*Laser Praxis–Supplement zu Hanser Fachzeitschriften*, Sep. © Carl Hanser Verlag, München 1992 entitled "3D–Laser–schneiden ohne zu warten" pp. 103–105.

*Laser Praxis–Supplement zu Hanser Fachzeitschriften*, Sep. © Carl Hanser Verlag, München 1992 entitled "Der Abstand bleibt gleich" by Stephan Biermann, pp. 99–102.

*Sensoranwendungen und Qualitätssicherung in der Laserbearbeitung*, Oct. 1993 in Dornach entitled "Scout: 3D Nahtführung" by Klaus Barthel, pp. 1–3.

*Primary Examiner*—Geoffrey S. Evans
*Attorney, Agent, or Firm*—Evenson, McKeown, Edwards & Lenahan, P.L.L.C.

[57] ABSTRACT

A compact laser machining head is used for laser machining of material, in particular for laser-supported material machining methods for 2D and 3d laser machining. This laser machining head includes a sensor for geometry recognition and/or following contours, one or a plurality of mirrors and/or mirror systems with a mirror housing and mirror holder, a defined interface with the beam guidance system of the machine, and further required structural elements, connections and lines. In this compact laser machining head, the sensor is structurally completely integrated into the laser machining head, is seated, together with other auxiliary devices of the laser machining head tied to the working direction, rotatable around the rotary shaft of the sensor. The laser machining head contains a protocol memory and a comparator unit which are disposed and connected in such a way that the data of the sensor can be compared and evaluated, in parallel with the control of the machining process, with the data of the protocol memory in the comparator unit for the purpose of quality control and affecting the machining process.

13 Claims, 1 Drawing Sheet

COMPACT LASER MACHINING HEAD WITH INTEGRATED ON-LINE PATH CONTROL FOR LASER MACHINING OF MATERIAL

BACKGROUND AND SUMMARY OF THE INVENTION

The invention relates to a compact laser machining head with integrated on-line path control for laser machining of material, in particular for laser-supported material machining or treatment methods with CNC-controlled portal machines or robots for two and three-dimensional (2D or 3D) laser machining. The machines or robots are particularly effective and useful in connection with laser beam cutting, laser beam welding and in methods for surface finishing.

On the one hand, it is generally known that laser machining processes, such as machining of surfaces or laser beam welding and cutting, require a high degree of accuracy in positioning the shaped or focused laser beam with respect to the surface of the structural pieces to be treated. This applies to both the contours which are to be treated or created and to the focal distance and the laser beam direction. On the other hand, structural pieces having complicated geometries and/or workpieces produced by deformation always have tolerances in shape and measurements. Further, it is also possible for deformations to occur during machining.

Although this problem can be limited with a considerable outlay for aligning and clamping the parts, such as is practiced during laser beam welding of assembly line work pieces, it nevertheless cannot be completely eliminated. Further, a considerable increase of the processing expense and a marked limitation of the flexibility of the laser machining is noted.

However, there is always a tremendous outlay for programming in connection with the laser machining of structural pieces having a complicated geometry, since as a rule each part must be individually programmed through the use of a "teach-in" or learning method. However, the individual programming results in long machine set-up times as noted in the following references: Bakowski et al., "3-D Laserschneiden ohne zu warten" [3-D Laser Cutting Without Waiting], in Laser-Praxis, supplement to Hanser Fachzeitschriften September, Carl Hanser, publ., 1992, pp. LS 103–105; Rollbühler G., "Lohnende Alternative zur Handarbeit" [Profitable Alternative to Manual Processing], in Laser-Praxis, supplement to Hanser Fachzeitschriften June, Carl Hanser, publ., 1992, pp. LS 8–9; Stratmann, K., "Kombinieren rechnet sich" [Combining Adds Up], in Laser-Praxis, supplement to Hanser Fachzeitschriften September, Carl Hanser, publ., 1993, pp. LS 99–102. Because of these problems, which represent considerable obstacles to the further growth and usage of 3-D laser machining, narrow limits have been set for broadening the fields of use of 3-D laser machining.

Attempts were therefore made to solve these problems through the use of sensor techniques. As already described by Biermann, S. "Der Abstand bleibt gleich" [The Distance Remains the Same] in Laser-Praxis, supplement to Hanser Fachzeitschriften September, Carl Hanser, publ., 1992, pp. LS 74–76, and in "Sensoranwendung und Qualitätssicherung in der Laserbearbeitung" [Sensor Employment and Quality Assurance in Laser Treatments], seminar papers of the Institute for Machine Tools and Industrial Sciences of the Technical University of München, 1993, distance control is successfully employed at present in laser beam cutting. For the use of robots, for example, solutions for following the seam are known, wherein measured signals provide feedback for one or several axes via control circuits.

A more recent solution for NC-controlled portal machines, which is employed for geometry recognition as well as for following contours, is based on the intelligent linking of commercial installation components using a special interface. As a rule, the sensor head is additionally fixedly flanged on the processing head used for the respective job in the process as described in "Sensoranwendung und Qualitätssicherung in der Laserbearbeitung" [Sensor Employment and Quality Assurance in Laser Treatments], seminar papers of the Institute for Machine Tools and Industrial Sciences of the Technical University of München, 1993, and "Scout sorgt für Präzision" [Scout Assures Precision], in Laser, June 1993.

For large scale laser material machining, this more recent solution has the disadvantage that these sensors, which represent an additional component, limit the work space and therefore cause considerable limitations with respect to accessibility, in particular accessibility of the inner contours. This limiting effect is further increased by the additional hose and cable connections required in most large scale laser machining methods.

A further disadvantage of this more recent solution lies in the fact that, as a rule, the sensors are here subjected to the environmental conditions occurring during laser machining in an unprotected manner. Among others, these conditions include vapors, gases, sublimates, plasma, spatters, heat and others. The detection assurance is therefore considerably prejudiced by this.

A further disadvantage is that the sensor attachment in most cases cannot be made reproducible. This drastically increases the adjustment efforts.

It is also disadvantageous in connection with this more recent solution that, as a rule, no possibility of sensor cooling is provided for commercial sensors. This greatly limits their employment options in connection with such laser machining heads.

While in connection with directionally independent laser machining processes, such as in 3-D laser cutting with coaxial gas jet guidance, five controlled axes of motion (for example three linear and two rotary axes) are sufficient for complete 3-D capability, a sensor operating in precession requires for its orientation an additional axis for spatial geometry recognition in order to turn the sensor around the tool axis (laser beam axis), analogous to direction-dependent laser machining processes, such as welding with off-axis nozzles and/or feeding of additional materials or hardening by means of a shaped laser beam. For this reason, an essential disadvantage of the more recent solution lies in the strong limitation of the functionality or the total loss of the unlimited 3-D capability of the system.

A serious disadvantage of the known solutions for geometry recognition and/or following contours is that the measured position values are used without the required evaluation and that, therefore, faulty machining becomes possible. A relation with set path values, known from CAD systems or from sample parts machined accurately to measurement, is not made.

There is therefore needed a laser machining head for laser machining of material, in particular large scale laser machining of material, which either has none of the above disadvantages of or which keeps them to a minimum.

It is therefore an object of the present invention to provide a laser machining head of the type mentioned above wherein the field of application of 3-D laser machining can be expanded; wherein the programming outlay or the set-up times in connection with laser machining of geometrically complex structural pieces is considerably reduced; and wherein for path control the measured path data are processed together with previously known set path data during machining in order to affect the process.

It is a further object of the invention to provide a laser machining head of the type mentioned above, through the use of which the work space is no longer limited and which no longer causes restrictions with respect to accessibility, in particular to inner contours.

Still further, it is the object of the invention to disclose a laser machining head as described above, wherein the sensors are not left unprotected with respect to the environmental conditions generally occurring during laser machining such as vapors, gases, sublimates, plasma, splatters, heat and others.

A further object of the invention lies in developing a laser machining head of the previously mentioned type, wherein the attachment of the sensor can always be reproduced, wherein therefore the adjusting effort is considerably reduced in comparison to laser machining heads in accordance with the prior art, and which permits the unrestricted uncomplicated use of commercial sensors.

Finally, it is also an object of the present invention to provide a laser machining head of the previously mentioned type which maintains full 3-D capability of the system.

The present invention meets these needs by providing a compact laser machining head with integrated on-line path control for laser machining of material, in particular for laser-supported material machining methods, such as cutting, welding and surface finishing methods with CNC-controlled portal machines or robots, for 2D and 3d laser machining. The compact laser machining head includes a sensor for geometry recognition and/or following contours; one or more of mirrors and/or mirror systems with a mirror housing and a mirror holder; a defined interface with the beam guidance system of the machine; installations and connections for water cooling and process gas feeding, one or more cross jet systems; adjustment devices and process or working gas nozzles; as well as drive devices, mounted on a motor plate for realizing the rotary movement of the sensor, such as an NC-controlled motor and gear as well as the required current and signal circuits and medium conduits. Structurally, the sensor is completely integrated into the laser machining head and is arranged, together with other auxiliary devices of the laser machining head tied to the working direction, so as to be rotatable around the rotary shaft of the sensor. The laser machining head contains a protocol memory and a comparator unit. These are disposed and connected in such a way that the data of the sensor is compared and evaluated, in parallel with the control of the machining process, with the data of a protocol memory in a comparator unit for the purpose of quality control and affecting the machining process.

The compact laser machining head for laser machining material is composed of an integrated on-line path control, in particular for large scale laser-supported material machining processes, such as cutting, welding and surface finishing methods with CNC-controlled portal machines or portal robots, for 2-D and 3-D laser machining, of a sensor for geometry recognition and/or following contours, of one or a plurality of mirrors and/or mirror systems with mirror housings and mirror holders, of a defined interface with the beam guidance system of the machine, of the required installations and connections for water lines and process gas feeding, of one or several cross-jet systems, of the required adjusting devices and process and exhaust gas nozzles, as well as of the required drive devices, mounted on the motor plate, for realizing the rotary motion of the sensor, such as an NC-controlled motor and gear, as well as the required electrical, and signal circuits and medium conduits. In accordance with the present invention, the compact laser machining head sensor for geometry recognition and/or following the contour of the workpiece is structurally completely integrated into the laser machining head and is seated, together with other auxiliary devices of the laser machining head tied to the direction of working, so as to be rotatable around the rotary shaft of the sensor.

Furthermore, in accordance with the present invention, the data output of the sensor is connected with the control of the installation as well as with a comparator, whose second output is connected with the set path data from a protocol memory and which reports the result of the comparison during the operation to the installation control for affecting the process.

It is advantageous in order to increase the interference protection, to dispose a path memory between the data output of the sensor and the data input of the control and the data input of the comparator unit. This is done so that the data from the sensor is stored and evaluated before it is provided to the control and the comparator unit.

It is also advantageous if the input to the protocol memory is directly connected with the sensor data and that, therefore, the contents of the protocol memory are determined by a master unit.

It has furthermore been shown to be advantageous to integrate the protocol memory, the comparator unit and/or the path memory into the CNC control.

In this connection it is advantageous if the sensor for geometry recognition and/or following the contours of the workpiece, and the auxiliary devices (for example off-axis throttles, auxiliary material feed devices or the like) tied to the working direction of the laser machining head, are about 360° rotatable around the rotary shaft of the sensor.

In the process, the rotary shaft of the sensor should be disposed in a defined relation to the tool axis, for example in such a way that the rotary shaft of the sensor is coincident with the vertical line through the center of the laser spot. This arrangement should be designed to be such that the axis of rotation of the sensor is spatially adjustable by displacing and/or tilting with respect to the tool axis. By doing this, it is possible to eliminate the otherwise present effect on the accuracy of detection and machining of position tolerances of the beam axis in relation to the mechanical axis, in particular with long beam paths.

Advantageously, the sensor, which preferably is an opto-electronic sensor, for example a SCOUT sensor, should be disposed to be adjustable with respect to its rotary shaft.

It is furthermore of advantage when the structural elements of the sensor are integrated in a space-saving manner into the conduit system of the machining head. This can be achieved, for example, by appropriate dimensioning. In this case, the sensor should have such dimensions that the interface with the machine contains, besides the functions necessary for the laser machining head, also those for the sensor, and that all protective measures for the optical devices, the structural elements of the machining head and the structural elements of the sensor are effective in the same way.

For further expanding the field of use for the laser machining head in accordance with the present invention, the capability should be provided for attaching on the rotary shaft of the sensor, besides the sensor for geometry recognition and/or following the contour itself, still further sensors, for example sensors for the automatic control of the machining results.

Advantageously, all required structural elements and components, including those of the sensor and the laser machining head should have such dimensions that they can all be disposed in a single housing of a size which is acceptable in the respective case of employment.

The laser machining head in accordance with the present invention is based on: 1) a defined mechanical interface for beam guidance containing the reproducible association of the beam axis, machining head and sensor, as well as the media feed; 2) one or more space-savingly integrated sensors for geometry recognition and/or following the contour, besides the optical structural elements for beam focusing and/or shaping, gas feeding, nozzle systems, installations for cooling the optical devices and nozzles, devices for the protection, particularly of the optical structural elements, and the like, inclusive of the current, signals and medium conduits, as well as further sensors or sensor systems, if required; and 3) an arrangement of a portion or of the entire laser machining head which is rotatable around the tool shaft (laser beam axis), so that the field of view of the sensor operating in precession, as well as the devices (for example off-axis nozzles, feed devices for auxiliary materials), which must be definedly arranged with respect to the machining direction, turn around the laser beam in a defined manner and can therefore be oriented with respect to the respective advancement direction.

All of the prior art disadvantages are eliminated through the use of the compact laser machining head in accordance with the invention. The following improvements over the prior art are also provided: 1) monitoring the path position measured by the sensor by means of a comparison with the stored set path data and immediate affecting of the machining process; 2) assuring the full functionality of the sensor-controlled 3-D geometry recognition and contour following with CNC-controlled portal machines; 3) containing the tool, the laser beam, all media and the sensor or sensors or sensor system in a single compact housing; 4) reproducible, adjustable arrangement or association of the sensor with the tool; 5) no adjustment expense in case of a change of the machining head because of an interface which is uniform for both tool and sensor or sensors; 6) the sensor is integrated into the cooling system for the optical element and possibly further auxiliary devices for machining, and integrated into the protective system for optical structural elements of the laser machining head, such as protective windows, cross jets, etc.; 7) no impediments because of additional cables and hoses; 8) the structural elements of the machining head can already be adjusted during mounting and need not be adjusted again before every use of the machining head; 9) additional mechanical adjustments are possible and can assure a defined setting of the position of the sensor field of view with respect to the sensor rotary shaft; and 10) no or only negligible limitations in the selection of the focal length, in particular, it is possible to use optical devices with a relatively short focal length which, in turn, cause small compensation movements of the linear axes and thus slight limitations in connection with 5-axes transformations.

Other objects, advantages and novel features of the present invention will become apparent from the following detailed description of the invention when considered in conjunction with the accompanying drawings.

DETAILED DESCRIPTION OF THE DRAWINGS

Figure 1:
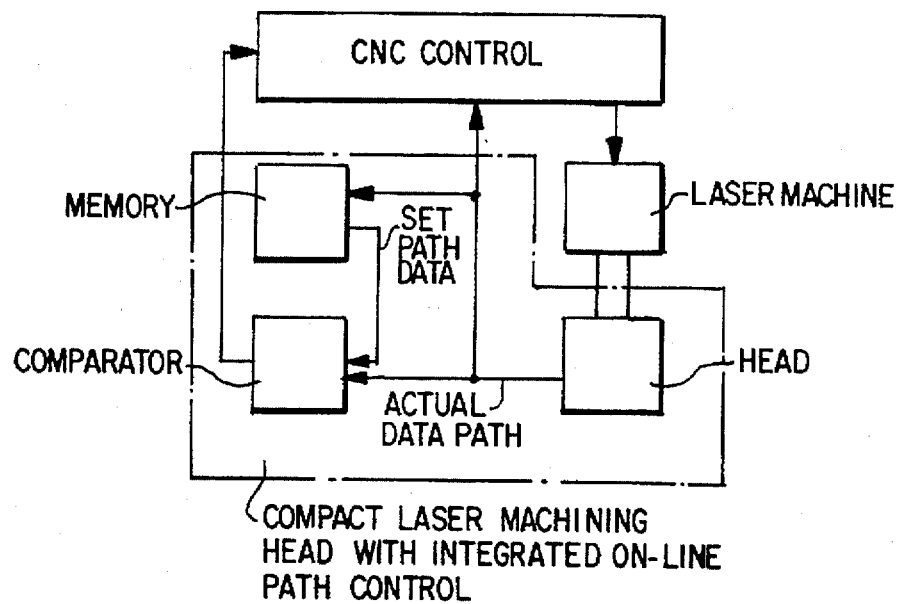
FIG. 1 is a schematic block diagram of the on-line path control of the compact laser machining head of the invention.

The on-line path control is represented in FIG. 1. The actual path data "b" measured by the machining head E is transmitted to the CNC control A for realizing the geometry recognition and/or contour following, and is simultaneously supplied to the machining unit. In the exemplary embodiment, this is a comparator D, which has, besides the actual path data "b", the set path data "a" from the protocol memory B. The set path data "a" has been previously determined with the aid of a master unit. If the deviation has been preset, an error signal for the CNC installation control A is generated with the aid of the comparator D when the actual path data "b" deviates from the set path data "a" by more than a predetermined value.

Figure 2:
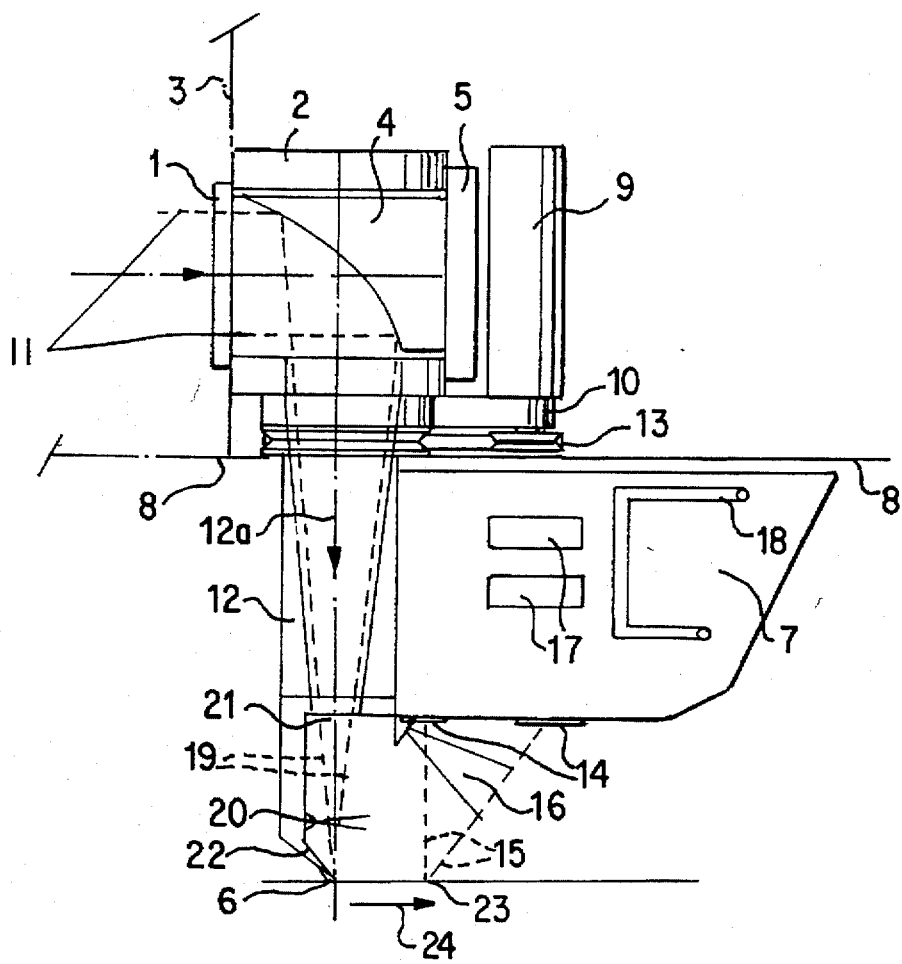
FIG. 2 is a schematic block diagram of a preferred embodiment of the compact laser machining head.

As represented in FIG. 2, the mirror housing 2 is reproducibly fastened on the beam guidance system 3 through the use of a defined interface 1. The mirror 4 is fixed by means of the housing 2 in a mirror holder 5. The laser beam 11 is turned by 90° and focused by the mirror 4.

A requirement for full 3-D capability is the rotation of the sensor 7 for geometry recognition and/or following of the contour over at least 360°. To do this, the sensor 7 must be turned under the interference contour 8 of the beam guide 3. Movement is performed by means of an NC-controlled motor 9. The motor, including auxiliary devices, is fastened on a separate motor plate 10 on the mirror housing 2. This plate 10 can be displaced with respect to the mirror housing 2 and, therefore, to the laser beam 11. Adjustment of this plate 10 in relation to the laser beam 11 must be performed such that the vertical line from the tool center point 6, which is identical with the center of the working point 6 of the laser beam 11, is located on the center of rotation 12a of the rotary shaft 12 of the sensor 7. In the case shown, the coincidence of the vertical line with the center of rotation 12a has already been established.

The transfer of the rotary motion of the motor 9 to the actual rotary shaft 12 is provided via a suitable gear 13. The sensor 7 is pivotably fastened to the shaft 12. The outlet windows 14 of the optical beam path 15 of the sensor 7 are protected from vapors and waste products by an air flow 16 from the cross jet. The electronic and optical structural elements 17 of the sensor 7 are protected, the same as the focusing mirror 4, from overheating, for example, by reflected heat from the laser, through the use of a water cooling system 18. A further cross jet 20 is generated in front of the outlet opening 21 for the protection of the optical structural elements of the laser beam path 19.

The feeding of the process gases to the process nozzle 22 at the machining spot takes place via the same system. The precession 24 of the scanning plane 23 with respect to the machining point 6 can be adjusted by a device not further explained here. On the one hand, the distance cannot be allowed to be too great, because of the increase in the angular error of the sensor rotary shaft 12. On the other hand, the risk of hampering the detection because of the machining process should be as small as possible.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A compact laser machining head having integrated on-line path control for laser machining of a material, comprising:

a sensor providing at least one of geometry recognition and contour following of the material;

at least one mirror having a mirror housing and mirror holder;

a predefined interface for a beam guidance system of a machine controlling the compact laser machining head;

an installation and connection for a water cooling system and a process gas feed used in the laser machining;

at least one cross jet system arranged on the compact laser machining head;

an adjustment device and a process gas nozzle for the laser machining head;

a motor plate having mounted thereon drive devices for providing rotary movement of the sensor, said drive devices including an NC-controlled motor and a gear operable via appropriate current and signal circuits and medium conduits;

wherein said sensor has a structure completely integrated into the laser machining head and includes a rotary shaft, said sensor being arranged, together with auxiliary devices of the laser machining head, so as to be rotatable around the rotary shaft;

a protocol memory and a comparator unit are arranged and connected in the laser machining head such that data from said sensor is compared and evaluated, in parallel with a control of the laser machining, with data of said protocol memory in the comparator unit for affecting the laser machining and providing quality control.

2. A compact laser machining head according to claim 1, wherein said compact laser machining head is used for at least one of laser-supported material cutting, welding, and surface finishing, with CNC-controlled portal machines for 2D and 3D laser machining.

3. A compact laser machining head according to claim 1, further comprising a control system, wherein for interference protection a path memory is disposed between the data output from the sensor and a data input of the control system or a data input of the comparator, and further wherein the data of the sensor is stored and evaluated in the path memory prior to being supplied to one of the control system and the comparator.

4. A compact laser machining head according to claim 3, wherein said protocol memory, said comparator and/or said path memory are integrated into said control system which is a CNC control system.

5. A compact laser machining head according to claim 1, wherein an input of the protocol memory is directly coupled with the data from the sensor, and further wherein contents of the protocol memory are therefore determined via a master unit.

6. A compact laser machining head according to claim 1, wherein said sensor and said auxiliary devices are rotatable over at least 360° around said rotary shaft.

7. A compact laser machining head according to claim 1, wherein said rotary shaft is arranged in a defined manner with respect to a tool axis.

8. A compact laser machining head according to claim 7, wherein said rotary shaft is arranged in a defined manner with respect to the tool axis such that it is coincident with a vertical line through a center of a laser spot.

9. A compact laser machining head according to claim 8, wherein said rotary shaft is disposed such that it is spatially adjusted with respect to the tool axis via at least one of displacement and tilting.

10. A compact laser machining head according to claim 1, wherein said sensor is disposed so as to be adjustable with respect to the rotary shaft.

11. A compact laser machining head according to claim 1, wherein said sensor is an opto-electronic sensor.

12. A compact laser machining head according to claim 1, wherein structural elements of the machining head are dimensioned such that the interface with the machine contains the functions necessary for both the laser machining head and the sensor, and further wherein protective measures provided for optical devices and the structural elements are effective in the same manner.

13. A compact laser machining head according to claim 1, further comprising additional sensors and adjustment devices fastened on the rotary shaft.

* * * * *